March 6, 1928.

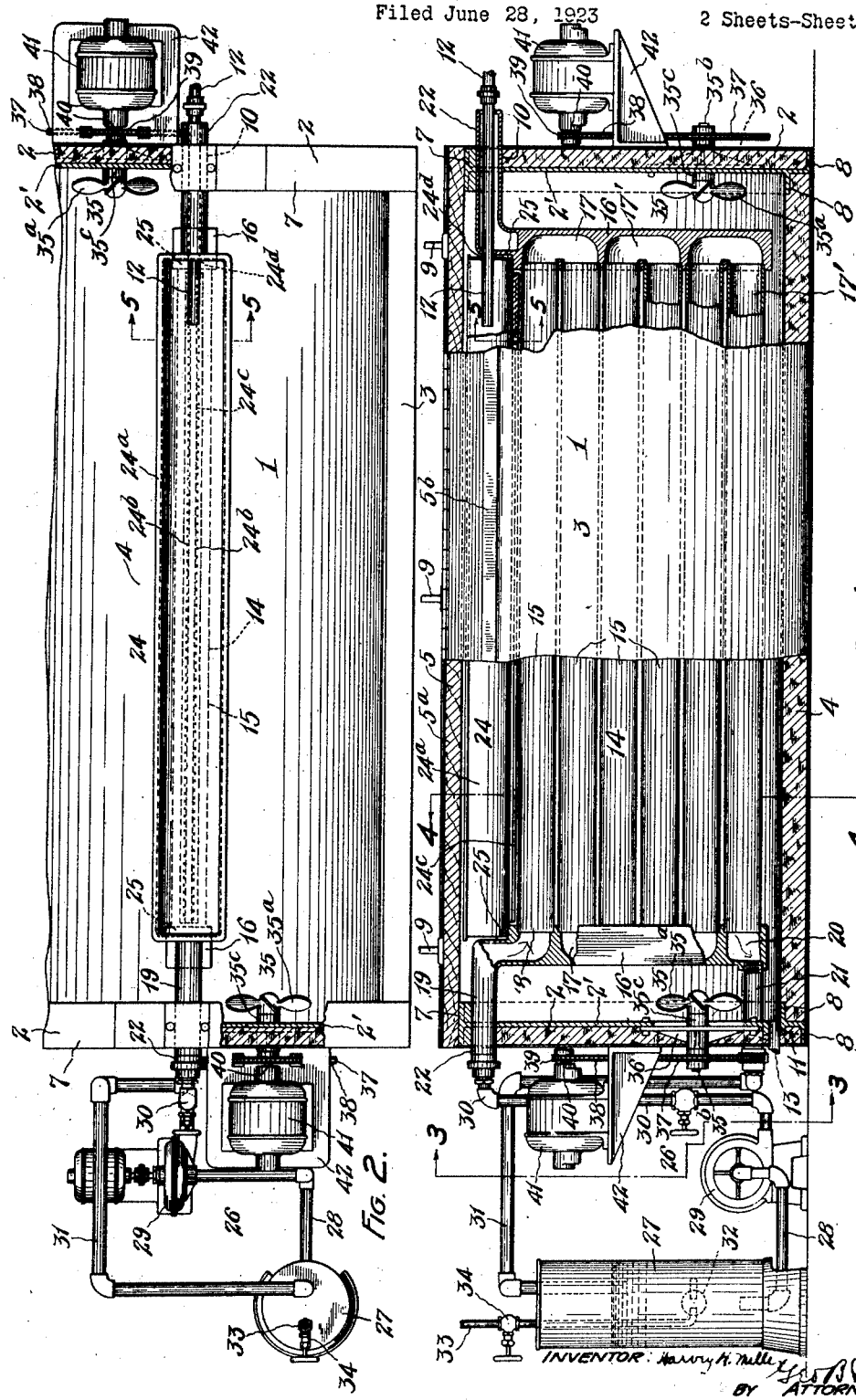

H. H. MILLER

LIQUID TREATING APPARATUS

Filed June 28, 1923

INVENTOR:
Harvey H. Miller
BY
Geo. A. Pitts
ATTORNEY.

Patented Mar. 6, 1928.

1,661,379

UNITED STATES PATENT OFFICE.

HARVEY H. MILLER, OF CANTON, OHIO, ASSIGNOR TO THE H. H. MILLER INDUSTRIES COMPANY, OF CANTON, OHIO, A CORPORATION OF OHIO.

LIQUID-TREATING APPARATUS.

Application filed June 28, 1923. Serial No. 648,334.

This invention relates to an apparatus for treating liquids, for example, milk and cream.

One object of the invention is to provide an apparatus of this character of relatively simple construction and adapted to treat milk and other liquid matters in an economical manner.

Another object of the invention is to combine with a receiving or holding vat an apparatus having a treating surface or surfaces over which milk or other liquid flows as it fills the vat, whereby its temperature may be readily and economically changed.

A further object of the invention is to provide a receiving or holding vat with means for spraying milk or other liquid while being discharged into the vat over a temperature changing surface, whereby the milk or other liquid may be quickly and economically treated.

Other objects of the invention will be apparent to those skilled in the art to which my invention relates from the following description, taken in connection with the accompanying drawings, wherein Fig. 1 is a view, partly in elevation and partly in section, of an apparatus embodying my invention.

Fig. 2 is a fragmentary top view on the line 2—2 of Fig. 3—that is, with the top or cover removed and parts broken away.

Figure 3:
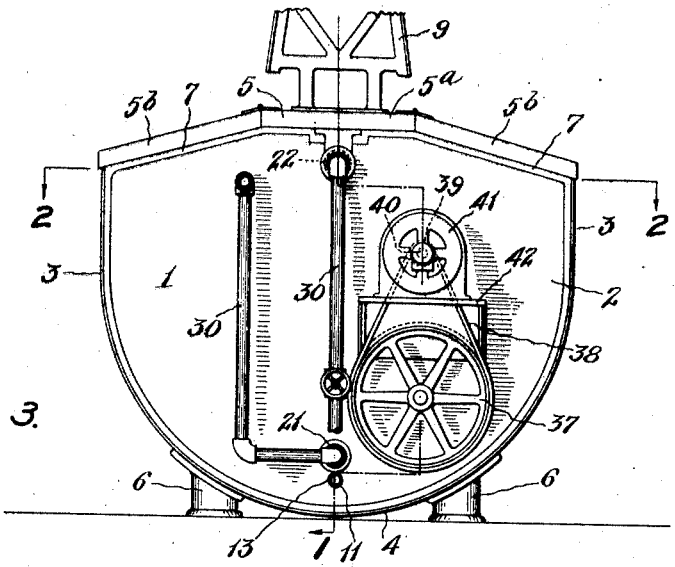
Fig. 3 is a section on the line 3—3 of Fig. 1.

In the drawings, 1 indicates a vat or holder for receiving and holding a liquid, such as milk or cream. The vat may be of any desired construction and shape, but for purposes of illustration, it comprises end walls 2, side walls 3, a bottom wall 4 and a top 5. The side and bottom walls are made continuous and the latter curved to facilitate manufacture as well as to insure easy cleaning and sanitary conditions in the use of the apparatus. Each of the walls referred to may comprise spaced plates having a suitable packing or insulating material between them to prevent the transfer of heat or cold thru the walls of the vat. The walls of the vat are also so constructed that it may be suitably supported in any preferred manner, for example, by a plurality of legs or standards 6. By preference, each of the end walls 2 includes a casting 2' having (a) along its upper edge flanges 7 forming a support for the top 5 and (b) along its side and lower edges flanges 8, to which the plates which constitute the side and bottom walls may be secured in any well known manner. The top 5 preferably comprises a main section 5ª and side sections 5ᵇ which are hinged to the main section and swingable upwardly as shown in dotted lines in Fig. 4, against a rest 9, to permit inspection and access to the interior of the vat 1.

The vat 1 is formed with openings 10, 11, the former being arranged in the upper portion of one end wall 2 and serving to receive an inlet pipe 12 for the liquid to be treated and the latter preferably being arranged in the lower portion of the other end wall 2 to provide for the emptying of the vat. The opening 11 preferably has connected to it a pipe 13 which may lead to any desired point. The pipes 12 and 13 may be controlled by suitable valves (not shown).

Figure 4:
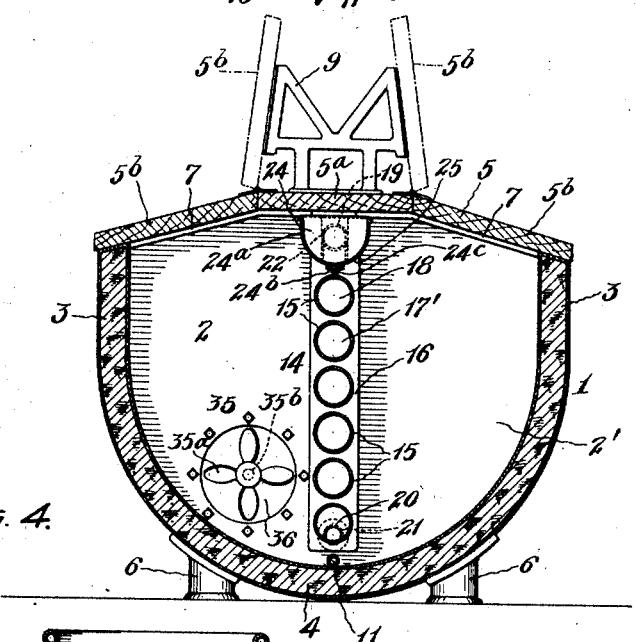
Fig. 4 is a section on the line 4—4 of Fig. 1.
Figure 5:
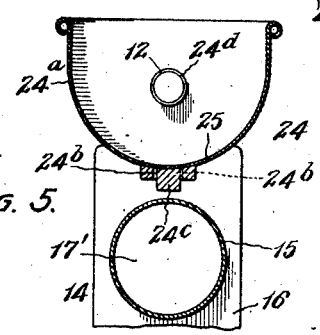
Fig. 5 is a fragmentary section on the line 5—5 of Fig. 2, but somewhat enlarged.

14 indicates as an entirety an apparatus arranged within the vat 1 through which a temperature changing medium flows and providing a surface or surfaces on which the milk may be sprayed or discharged in a relatively thin film as it is delivered or discharged into the vat by the inlet pipe 12, and over which the milk may flow in a relatively thin film as it fills the vat, whereby the milk is heated or cooled as the vat fills in the manner later to be set forth. The surface treating apparatus 14 preferably extends longitudinally and centrally of the vat 1 and from a point near its bottom wall 4 to a point near the top 5 in order to provide a maximum treating surface for the milk to flow over. The surface treating apparatus 14 preferably comprises a plurality of pipes 15, disposed in parallelism in a vertical plane, and rigidly secured at their opposite ends to manifolds 16 and connected with passages 17 formed in the latter, so as to provide one continuous conduit 17′ through the pipes for the temperature changing medium, one end of the conduit having an inlet 18 connected with an inlet pipe 19 and the other end of the conduit having an outlet 20 connected with a pipe 21. The temperature changing medium may be of any desired character, depending upon whether or not the milk is to be heated or cooled or maintained substantially at a predetermined temperature. Accordingly, steam, hot water, cold water, brine or other medium may be caused to flow through the conduit 17', as desired; that is, the apparatus may be used as a heater or a cooler for the milk, or for maintaining the milk at a predetermined temperature, or the apparatus may be alternately used for heating or cooling purposes. The manifolds 16 are preferably provided at their upper ends and with laterally projecting brackets or arms 22 which fit into the openings 10 formed in the end walls 2 and thus serve to support the surface treating apparatus in the vat 1, as shown in Figs. 1 and 4. The brackets or arms 22 are preferably hollow, so that one may accommodate the receiving pipe 12 and the other may serve as the inlet or outlet pipe 19 for the heating or cooling medium, depending upon whether the medium flows through the conduit 17' in one direction or the other. If desired, the pipes 15 may be formed of suitable material which has a relatively high coefficient of heat conductivity. 24 indicates as an entirety means for discharging the milk or other liquid in relatively small streams or spray form or a thin film on to the upper pipe 15, whereby the milk or other liquid may flow over the pipes successively as it flows downwardly to or toward the bottom of the vat. The discharge means 24 preferably comprises a trough 24$^a$ having a length substantially equal to the length of the pipes 15 and formed in its bottom wall with a plurality of ports 24$^b$, which discharge the milk in relatively small streams. In the preferred form of construction, I provide two rows of ports 24$^b$ and arrange between them a bar or plate 24$^c$, the opposite faces of which serve as flow walls to guide the milk from the ports 24$^b$ downwardly on to the upper pipe 15. The trough 24$^a$ is formed with an opening 24$^d$ through which the pipe 12 extends, as shown in Fig. 1. The opposite ends of the trough 24$^a$ are supported upon the upper ends of the manifolds 16, the latter being preferably formed with sockets 25 which form seats to receive such ends.

By preference, the surface treating apparatus 14 is constructed substantially in accordance with like elements and parts disclosed in Letters Patent No. 1,352,215, granted to Leroy S. Pfouts on the 7th day of September, 1920, to which reference may be made.

26 indicates as an entirety means for supplying and circulating the temperature changing medium to and from the surface treating apparatus 14. The supply and circulating means illustrated is arranged to supply hot water to the inlet pipe 19, but it will be understood that by connecting the inlet and outlet pipes 19, 21, respectively, with suitable supply and discharge pipes for cold water, brine or other refrigerating medium, the apparatus may be used for cooling purposes. Of the supply and circulating means 26, 27 indicates a tank for containing a body or quantity of water. 28 indicates a pipe preferably leading upwardly thru the bottom of the tank 27, and connected with a pump, for example, a rotary pump 29 from the discharge end of which leads a pipe 30 connected to the inlet pipe 19 in a well known manner. 31 indicates a pipe leading from the outer end of the pipe 21, to the tank 27 for discharging the medium therein. The pump 29 serves to draw water from the tank 27 and to force it thru the pipe 30 and conduit formed by the pipes 15 and manifolds 16, from which conduit the medium flows back to the tank 27 to be again circulated through the system. The water in the tank 27, and hence thruout the circulating system is heated to and maintained at any predetermined temperature in any suitable manner, but preferably by a steam injector 32 which may be of any well known construction. The injector 32 is connected with a steam supply pipe 33 which is provided with a valve 34 to regulate the supply of steam to the injector.

35 indicates means for causing the liquid in the vat to keep in motion, or under agitation, or flowing around or from end to end of the vat to maintain all portions of the liquid in substantially uniform condition and to insure uniform treatment of the entire body of the liquid due to the effects of the temperature changing medium flowing thru the surface treating apparatus 14 and to cause all portions of the liquid to contact with the surface or surfaces of the latter. The agitating means 35 preferably comprise one or more rotating devices preferably disposed at the end or ends of the vat 1. Each agitating device 35 may comprise a plurality of revolving blades 35$^a$ disposed at an angle so as to set up a flow or current in the body of the liquid resulting from their revolving motion. I preferably provide an agitating means 35 at each end of the vat 1 and on the opposite sides of the surface treating apparatus 14 so that one such agitating means operates in line with the space between one side of such apparatus and the adjacent side wall 3 and the other agitating means operates in line with the space between the other side of such apparatus and the adjacent side wall 3, thereby insuring generation of a current at either side of the surface treating apparatus and substantially from end to end of the vat. The blades 35$^a$ of each agitating means 35 are secured to a shaft 35$^b$, which is mounted in a suitable journal or bearing 35$^c$ and the bearing 35$^c$ may be formed integral with a plate 36 which is secured to the adjacent end wall 2 and forms a cover for an opening therein to permit the assembly and removal of the agitating means. The outer end of the shaft 35$^b$ preferably carries a sprocket wheel 37 for a drive chain 38 which runs over a sprocket 39 fixed to the shaft 40 of a motor 41. The motor 41 is preferably an electric motor suitably mounted on a bracket or stand 42 supported on the end wall 2. As shown, each agitating means 35 is driven by a separate motor so that either may be operated independent of the other or both operated simultaneously as well as provide for the assembly of the apparatus with either one or both such agitating means.

In the use of the apparatus, the milk or other liquid which is to be delivered to the vat 1 for treatment is caused to be sprayed or discharged in small streams over the outer surfaces of the pipes 15 through which the temperature changing medium is caused to flow, so that the treatment of the milk commences as soon as the vat commences to fill, and accordingly, by the time the filling step is completed the temperature of the milk has been materially changed and less time is required to complete the treatment. By arranging the spraying means at the top of the vat, it will be seen that the treatment of the milk by contact with the surfaces of the pipes continues until the milk rises to the full capacity of the vat. Accordingly, it will be seen that the apparatus may be operated with great economy and in a simple manner. Furthermore, I am enabled to accomplish this advantage without the use of moving parts within the vat and liquid connections through the walls of the vat therewith, so that the elements may be readily made and assembled.

By arranging the surface treating apparatus 14 centrally and longitudinally of the vat, I provide a dividing wall which serves to provide channels for the milk to flow through by reason of the operation of the agitating means 35. By arranging these means in line with the space between either side of the surface treating apparatus and the side walls of the vat 1, currents may be readily set up to maintain the milk properly mixed and in uniform condition while being treated or stored.

By extending the outlet pipe 21 through the adjacent wall 2, it operates to prevent lateral movement of the lower end of the surface treating apparatus.

While I have disclosed a construction where in liquid is used as the temperature changing medium, it will of course be understood that other mediums may be used, for instance, a vapor or gas, if desired.

To those skilled in the art of making apparatus of the class described, many alterations in construction and widely differing embodiments and applications of my invention will suggest themselves, without departing from the spirit and scope thereof. My disclosures and the description herein are purely illustrative and are not intended in any sense limiting.

What I claim is:

1. In apparatus of the class described, the combination of a vat, a treating apparatus stationarily mounted therein between and in spaced relation to its side walls and comprising a conduit the surfaces of which form flow walls for the liquid to be delivered to said vat, means extending longitudinally of the upper section of said conduit for discharging the liquid thereon, means for supplying liquid to said discharging means, means for causing a temperature changing medium to flow through said conduit, and separate means for causing a circulation of the liquid in said vat relative to said treating apparatus.

2. In apparatus of the class described, the combination of a vat or receptacle, a plurality of pipes disposed vertically in parallelism and stationarily mounted longitudinally of said vat or receptacle in spaced relation to the side walls thereof and connected at their ends to form a continuous conduit having an inlet and an outlet, a receiving trough stationarily mounted above and extending longitudinally of the uppermost pipe, said trough being provided with discharge means for the liquid to be treated in the vat and a flow wall leading from said discharge means, means for supplying liquid to said trough, and connections with said inlet and outlet for a temperature changing medium.

3. In apparatus of the class described, the combination of a vat, a treating apparatus stationarily mounted in said vat and extending longitudinally thereof in spaced relation to its side walls, said apparatus comprising a plurality of connected pipes disposed in vertical alignment, a supply means disposed above and extending longitudinally of said treating apparatus and provided with means for spraying liquid onto the upper pipe, means for causing a temperature changing medium to flow through said pipes, and means at one side of said apparatus for agitating the liquid delivered to said vat.

4. In apparatus of the class described, the combination of a vat or receptacle for a liquid, a member disposed vertically and extending longitudinally of said vat or receptacle and spaced from the side walls thereof, said member being formed with a conduit through which a temperature changing medium flows, and agitating means carried by each end wall of said vat or receptacle, one said agitating means being arranged to effect a current flow of the liquid in the space at one side of said member and the other said agitating means being arranged to effect a current flow of the liquid on the other side of said member.

5. In apparatus of the class described, the combination of a vat or receptacle for a liquid to be treated, a member disposed vertically and extending longitudinally of said vat or receptacle and spaced from the side walls thereof, said member being formed with a conduit through which a temperature changing medium flows, and agitating means at one end of said vat or receptacle and arranged substantially in line with the space between one side of said member and the adjacent side wall of said vat or receptacle.

6. In apparatus of the class described, the combination of a vat or receptacle for a liquid to be treated, a member disposed vertically and extending longitudinally of said vat or receptacle and spaced from the side walls thereof, said member being formed with a conduit through which a temperature changing medium flows, an agitating means at one end of said vat or receptacle and arranged substantially in line with the space between one side of said member and the adjacent side wall of said vat or receptacle, and an agitating means at the other end of said vat or receptacle and arranged substantially in line with the space between the other side of said member and the adjacent side wall of said vat or receptacle.

In testimony whereof, I have hereunto subscribed my name.

HARVEY H. MILLER.